United States Patent
Wang et al.

(10) Patent No.: US 8,302,182 B2
(45) Date of Patent: Oct. 30, 2012

(54) EMBEDDED SYSTEM WITH AUTHENTICATION, AND ASSOCIATED AUTHENTICATION METHOD

(75) Inventors: Chuan-Hung Wang, Kaohsiung County (TW); Chin-Tai Liu, Nantou County (TW); Ken-Hao Liu, Taichung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 538 days.

(21) Appl. No.: 12/202,423

(22) Filed: Sep. 1, 2008

(65) Prior Publication Data
US 2010/0058461 A1  Mar. 4, 2010

(51) Int. Cl.
*G06F 12/00* (2006.01)
(52) U.S. Cl. .............................. 726/17; 713/187; 726/21
(58) Field of Classification Search ...................... 726/17
See application file for complete search history.

(56) References Cited

U.S. PATENT DOCUMENTS

| | | | |
|---|---|---|---|
| 7,536,540 B2 * | 5/2009 | Holtzman et al. | 713/2 |
| 2003/0088618 A1 * | 5/2003 | Sueyoshi et al. | 709/203 |
| 2007/0198851 A1 * | 8/2007 | Goto | 713/187 |
| 2007/0223389 A1 * | 9/2007 | Basso et al. | 370/252 |

* cited by examiner

*Primary Examiner* — Shewaye Gelagay
(74) *Attorney, Agent, or Firm* — Winston Hsu; Scott Margo

(57) ABSTRACT

An embedded system with authentication includes: a system read only memory (ROM), a processing circuit and an authentication circuit. The system ROM is arranged to store a boot code. In addition, the processing circuit is arranged to process at least according to the boot code in order to perform operations of the embedded system. Additionally, the authentication circuit is arranged to perform authentication on a command script in order to determine whether the command script is authenticated, and is arranged to prevent the command script from being executed by the processing circuit when the authentication circuit determines that the command script is not authenticated, wherein the command script is received from outside a chip where the system ROM, the processing circuit and the authentication circuit are positioned.

22 Claims, 5 Drawing Sheets

EMBEDDED SYSTEM WITH AUTHENTICATION, AND ASSOCIATED AUTHENTICATION METHOD

BACKGROUND

The present invention relates to embedded systems, and more particularly, to an embedded system with authentication, and to an associated authentication method.

Typically, an embedded system vendor is encouraged to reduce a size of a boot code stored in a system read only memory (ROM) within an embedded system since reducing the size of the boot code may decrease the required storage volume of the system ROM and further save related costs of the embedded system, such as material and manufacturing costs thereof. Thus, the embedded system vendor can launch a product at a budget price by saving the related costs mentioned above, and therefore increase its market share.

In practice, it is suggested to install a non-volatile memory storing a program code for providing the embedded system with more functions than that of the boot code. However, in a worst situation, a hacker may hack the embedded system by replacing the program code or the non-volatile memory. As a result, a trade-off between the security of the embedded system and the functions provided by the program code is introduced.

SUMMARY

It is therefore an objective of the claimed invention to provide an embedded system with authentication, and to provide an associated authentication method, in order to solve the above-mentioned problem.

It is another objective of the claimed invention to provide an embedded system with authentication, and to provide an associated authentication method, in order to provide high flexibility of various cost-efficient installation schemes without degrading the security of the embedded system.

An exemplary embodiment of an embedded system with authentication comprises: a system read only memory (ROM), a processing circuit and an authentication circuit. The system ROM is arranged to store a boot code. In addition, the processing circuit is arranged to process at least according to the boot code in order to perform operations of the embedded system. Additionally, the authentication circuit is arranged to perform authentication on a command script in order to determine whether the command script is authenticated, and is arranged to prevent the command script from being executed by the processing circuit when the authentication circuit determines that the command script is not authenticated, wherein the command script is received from outside a chip where the system ROM, the processing circuit and the authentication circuit are positioned.

An exemplary embodiment of an authentication method of an embedded system comprises: providing a system ROM, a processing circuit and an authentication circuit; utilizing the system ROM to store a boot code; utilizing the processing circuit to process at least according to the boot code in order to perform operations of the embedded system; and utilizing the authentication circuit to perform authentication on a command script in order to determine whether the command script is authenticated, and prevent the command script from being executed by the processing circuit when the authentication circuit determines that the command script is not authenticated, wherein the command script is received from outside a chip where the system ROM, the processing circuit and the authentication circuit are positioned.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
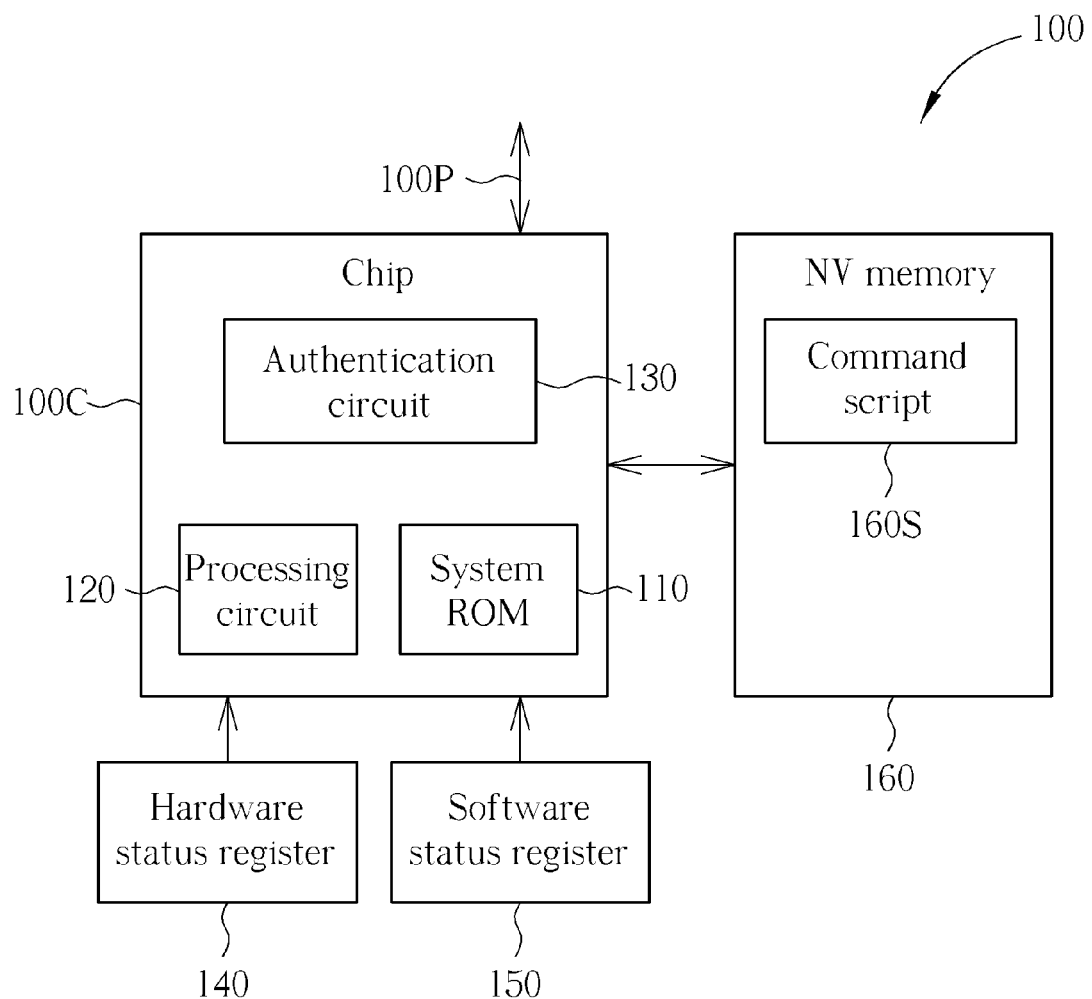
FIG. 1 is a diagram of an embedded system with authentication according to a first embodiment of the present invention.

Please refer to FIG. 1, which shows an embedded system 100 with authentication according to a first embodiment of the present invention. The embedded system 100 comprises a system read only memory (ROM) 110, a processing circuit 120 and an authentication circuit 130. In practice, the system ROM 110, the processing circuit 120 and the authentication circuit 130 are all positioned within a chip 100C. According to this embodiment, the embedded system 100 further comprises a hardware status register 140, a software status register 150 and a non-volatile (NV) memory 160 such as an electrically erasable programmable ROM (EEPROM) or a Flash memory. In addition, the embedded system 100 further comprises a serial port 100P for coupling the chip 100C to a host.

According to this embodiment, the system ROM 110 is arranged to store a boot code, and the processing circuit 120 is arranged to process at least according to the boot code in order to perform operations of the embedded system 100, where the authentication circuit is arranged to perform authentication for the embedded system 100, and more particularly, the chip 100C. In addition, the hardware status register 140 provides the processing circuit 120 with hardware statuses, and the software status register 150 provides the processing circuit 120 with software statuses. As shown in FIG. 1, the NV memory 160 is utilized for storing a command script 160S.

Figure 2:
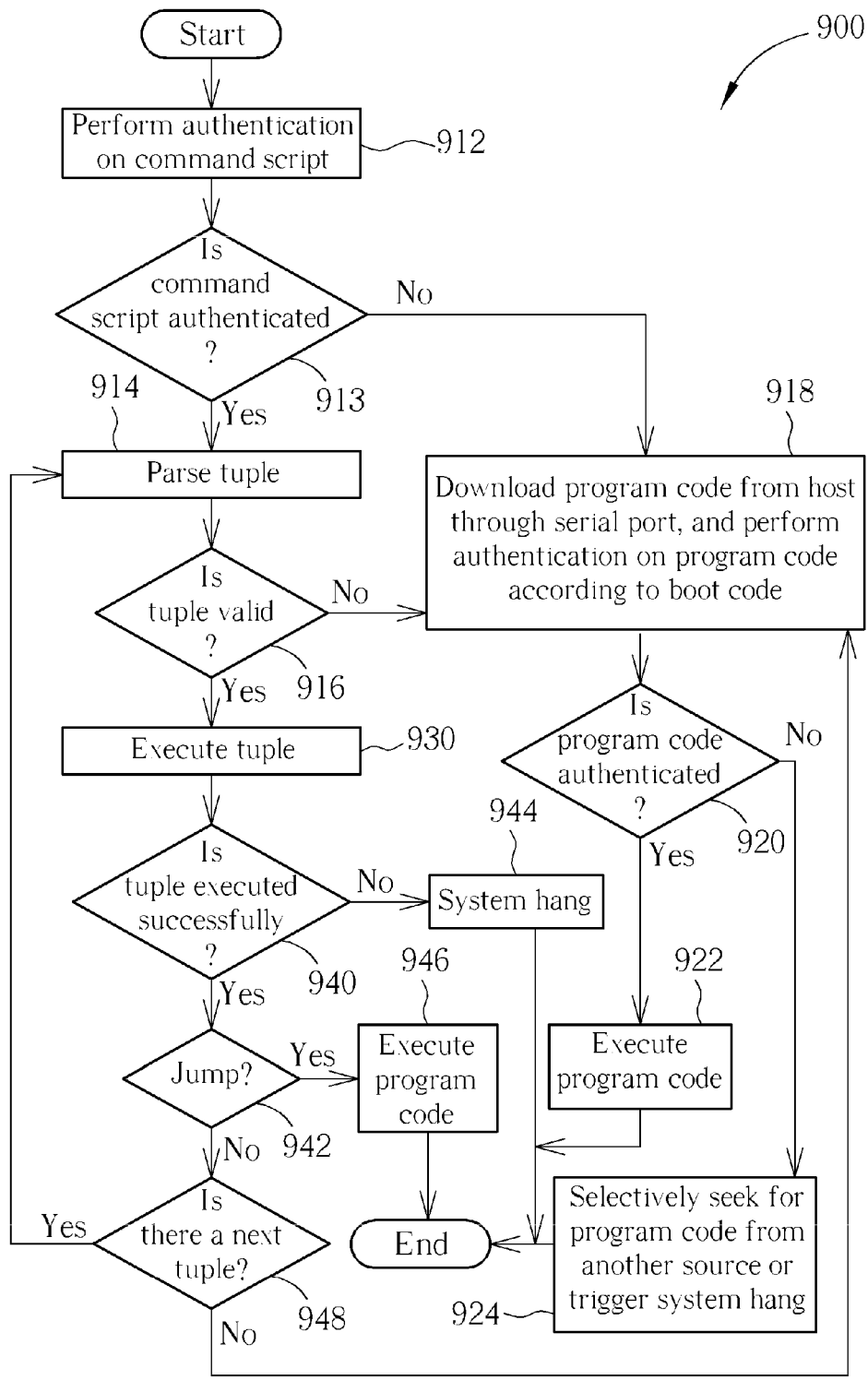
FIG. 2 is a flowchart of an authentication method of an embedded system according to one embodiment of the present invention.

FIG. 2 is a flowchart of an authentication method 900 of an embedded system according to one embodiment of the present invention. The authentication method 900 can be applied to the embedded system 100 shown in FIG. 1, and can be implemented with the embedded system 100 shown in FIG. 1. Thus, the authentication method 900 comprises providing the system ROM 110, the processing circuit 120 and the authentication circuit 130 mentioned above. In addition, the authentication method 900 further comprises utilizing the system ROM 110 to store the boot code, utilizing the processing circuit 120 to process at least according to the boot code in order to perform operations of the embedded system 100, and utilizing the authentication circuit 130 to perform the authentication mentioned above. With reference to FIG. 2, details of the authentication method 900 are further described as follows.

Figure 3:
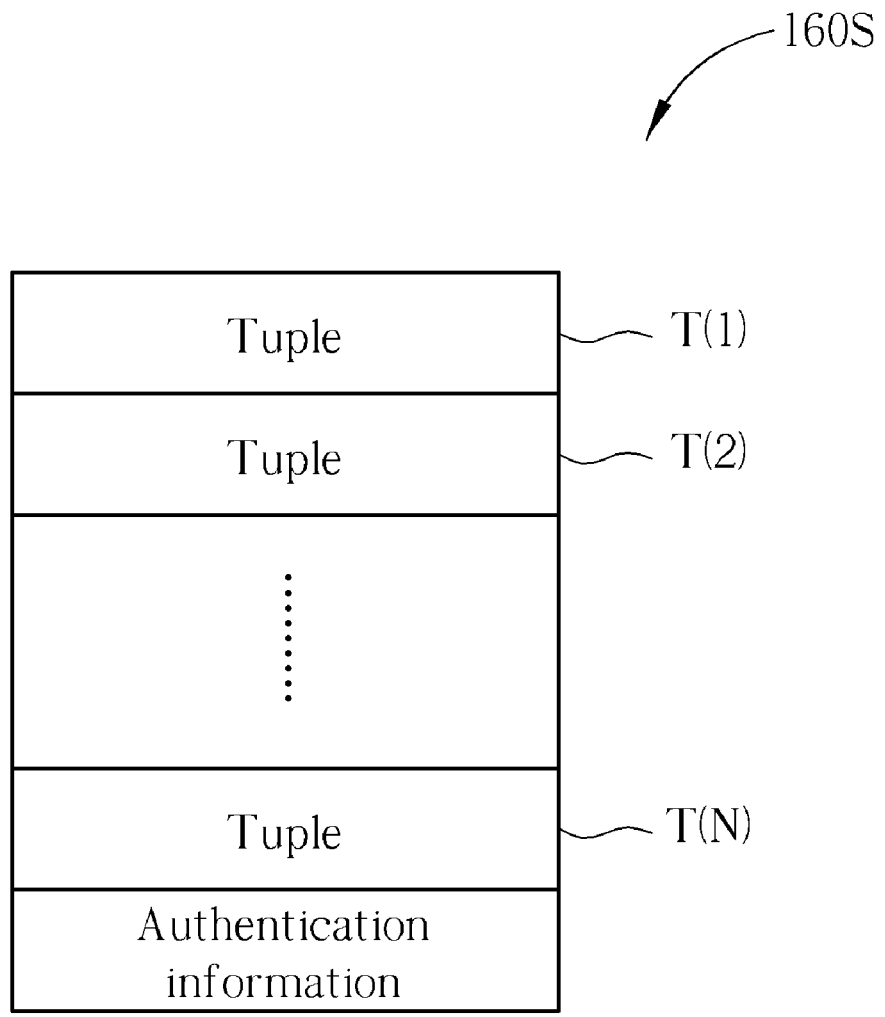
FIG. 3 illustrates a plurality of tuples and authentication information within the command script shown in FIG. 1.

In Step 912, the authentication circuit 130 performs the authentication on the command script in order to determine whether the command script is authenticated. As shown in FIG. 3, the command script 160S mentioned above comprises a plurality of tuples T(1), T(2), . . . , and T(N) and authentication information, where the authentication information is generated in accordance with the tuples T(1), T(2), . . . , and T(N). By checking whether the authentication information corresponds to the tuples T(1), T(2), . . . , and T(N), the authentication circuit 130 may determine whether the command script 160S is authenticated. For example, the authentication information represents a predetermined function PF(T(1), T(2), . . . , T(N)) of the tuples T(1), T(2), . . . , and T(N), and the authentication circuit 130 determines whether the command script 160S is authenticated by checking a calculation result of the predetermined function PF(T(1), T(2), . . . , T(N)).

In Step 913, when a result of the authentication (e.g. the calculation result of the predetermined function PF(T(1), T(2), . . . , T(N))) indicates that the command script 160S is authenticated, Step 914 is entered; otherwise, Step 918 is entered. As a result, the authentication circuit 130 prevents the command script 160S from being executed by the processing circuit 120 when the authentication circuit 130 determines that the command script 160S is not authenticated.

Please note that the command script 160S is received from outside the chip 100C where the system ROM 110, the processing circuit 120 and the authentication circuit 130 are positioned since the command script 160S is originally stored in the NV memory 160 for being accessed by the processing circuit 120. Once a hacker tries to hack the embedded system 100 by replacing the command script 160S or the NV memory 160, the embedded system 100 of this embodiment seeks for a program code from another source instead of being hacked by the hacker.

For example, when the authentication circuit 130 determines that the command script 160S is not authenticated, Step 918 is entered and the authentication circuit 130 triggers the embedded system 100 to download a program code from the host mentioned above through the serial port 100P, and the processing circuit 120 performs authentication on the program code according to the boot code. In Step 920, when the program code downloaded through the serial port 100P is authenticated, Step 922 is entered and the processing circuit 120 executes the program code; otherwise, Step 924 is entered and the processing circuit 120 may selectively seek for a program code from another source or trigger a system hang to stop operations of the embedded system 100.

In this embodiment, when the authentication circuit 130 determines that the command script 160S is authenticated, Step 914 is therefore entered and the processing circuit 120 parses one of the tuples T(1), T(2), . . . , and T(N) in order to determine whether the tuple is valid. For example, regarding the same command script 160S, when Step 914 is entered for the first time in the loop comprising Steps 914, 916, 930, 940, 942 and 948, the tuple to be parsed is the first tuple T(1). In another example, regarding the same command script 160S, when Step 914 is entered for the $n^{th}$ time in the loop mentioned above (n=1, 2, . . . , or N), the tuple to be parsed is the $n^{th}$ tuple T(n).

In Step 916, when the processing circuit 120 determines that the tuple is valid, Step 930 is entered; otherwise (i.e. the processing circuit 120 determines that the tuple is invalid), Step 918 is entered.

As a result, when determining that the tuple is invalid, the processing circuit 120 prevents the tuple from being executed and triggers the embedded system to download from the host through the serial port 100P a program code such as that mentioned above, and the processing circuit 120 performs authentication on the program code according to the boot code as mentioned. Similar descriptions are not repeated here.

In this embodiment, when the processing circuit 120 determines that the tuple is valid, Step 930 is entered and the processing circuit 120 executes the tuple.

In Step 940, when the processing circuit 120 executes the tuple successfully, Step 942 is entered; otherwise (i.e. when the processing circuit 120 executes the tuple unsuccessfully), Step 944 is entered and the processing circuit 120 triggers a system hang to stop operations of the embedded system 100 as mentioned.

In Step 942, when the tuple leads to a jump operation, Step 946 is entered and the processing circuit 120 executes a program code (e.g. a bootloader program code of a user bootloader) as a result of the jump operation; otherwise (i.e. when the tuple does not lead to a jump operation), Step 948 is entered.

In Step 948, when there is a next tuple within the command script 160S, Step 914 is re-entered and the processing circuit 120 parses the next tuple in order to determine whether the next tuple is valid; otherwise (i.e. when there is not a next tuple within the command script 160S), Step 918 is entered and the processing circuit 120 of this embodiment triggers the embedded system 100 to download from the host through the serial port 100P a program code such as that mentioned above, and the processing circuit 120 performs authentication on the program code according to the boot code. Similar descriptions are not repeated here.

According to this embodiment, each of the tuples T(1), T(2), . . . , and T(N) shown in FIG. 3 comprises a command code representing a command, and further comprises at least one command parameters for the command, such as a plurality of command parameters. In addition, some of the tuples T(1), T(2), . . . , and T(N) shown in FIG. 3 may further comprise condition information.

Figure 4:
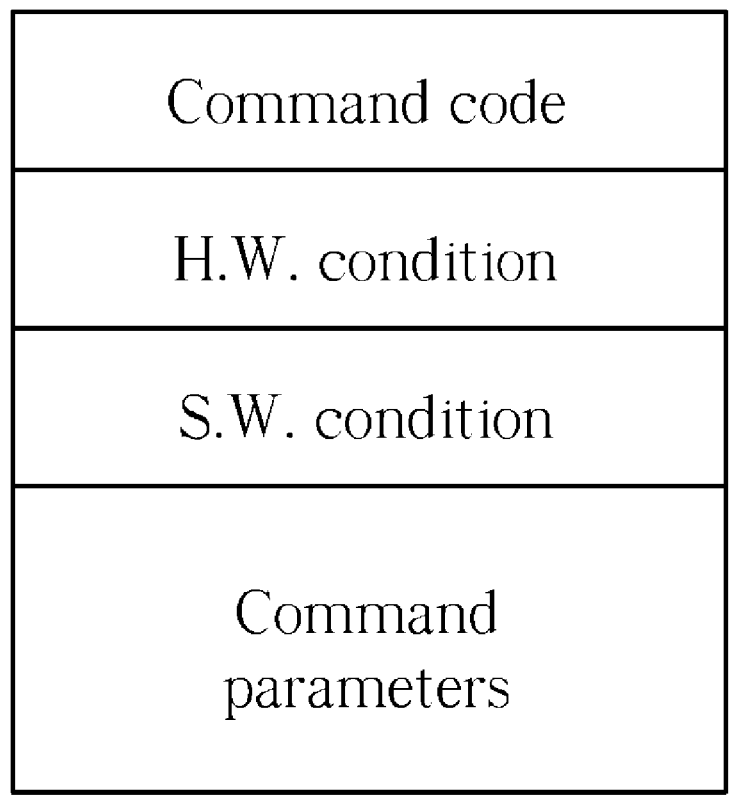
FIG. 4 illustrates one of the tuples shown in FIG. 3 according to one embodiment of the present invention.

FIG. 4 illustrates one of the tuples T(1), T(2), . . . , and T(N) shown in FIG. 3 according to one embodiment of the present invention. As shown in FIG. 4, in addition to the command code and the command parameters, the tuple further comprises condition information indicating at least one condition (e.g. a software condition and/or a hardware condition) where the command of the tuple is executed. For example, the condition comprises a software condition (whose condition information is labeled "S.W. condition") where the command of the tuple is executed, and further comprises a hardware condition (whose condition information is labeled "H.W. condition") where the command of the tuple is executed. According to this embodiment, when either the software condition or the hardware condition is not satisfied, the command of the tuple is not executed. The scheme of this embodiment provides high flexibility on managing additional functions a program code derived from outside the chip 100C, and ensures the correctness of execution results of the additional functions the program code derived from outside the chip 100C.

Figure 5:
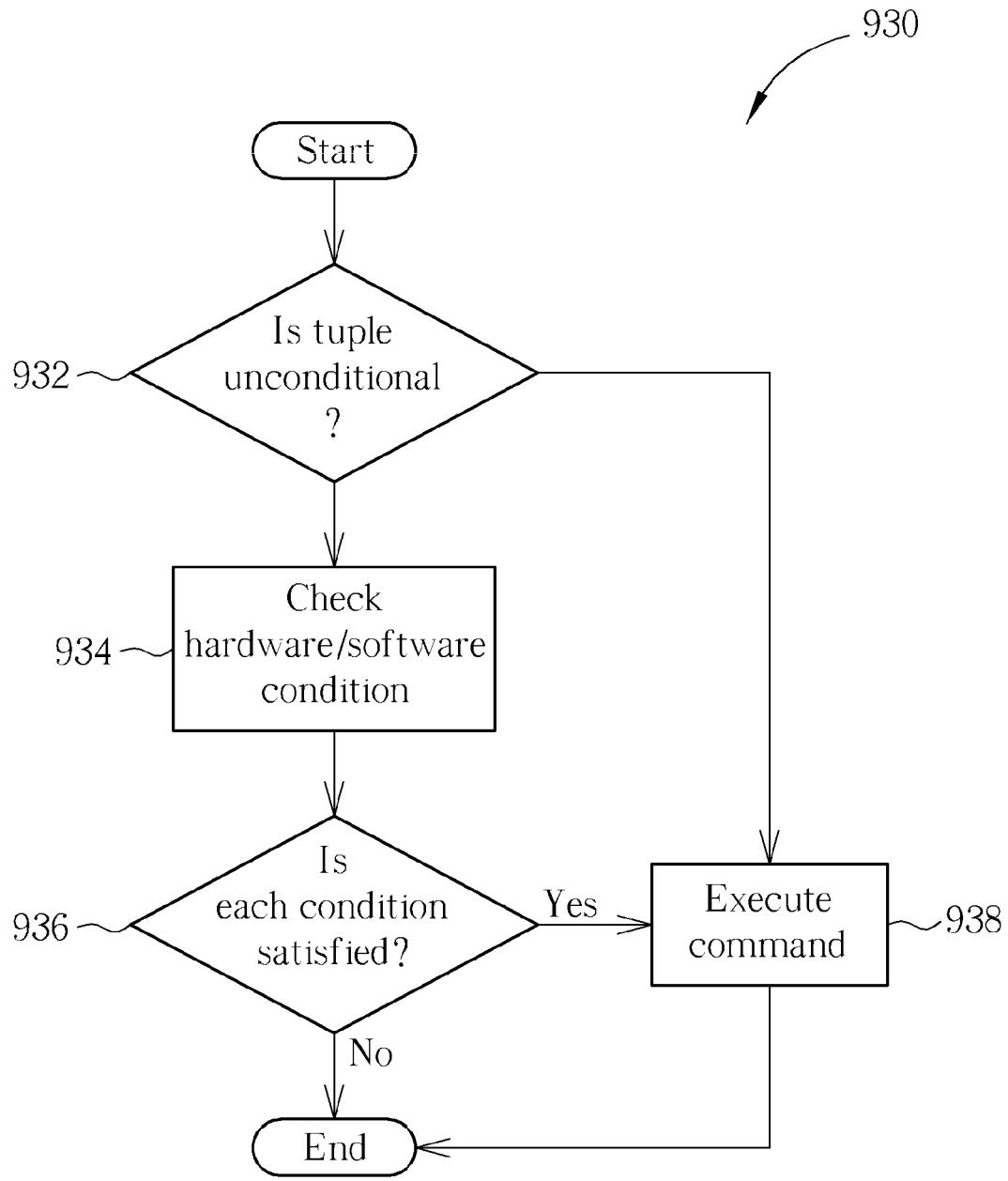
FIG. 5 illustrates some details of the step of executing a tuple in the embodiment shown in FIG. 2.

With reference to FIG. 5, some details of Step 930 in the embodiment shown in FIG. 2 are further described as follows.

In Step 932, the processing circuit 120 checks whether the tuple is unconditional according to whether the tuple comprises condition information indicating at least one condition where the command of the tuple is executed. In this embodiment, the tuple is determined to be unconditional when no condition information exists, and the tuple is determined to be conditional when condition information indicating at least one condition where the command of the tuple is executed exists.

As a result, when the tuple comprises condition information indicating at least one condition where the command of the tuple is executed, Step 934 is entered and the processing circuit 120 checks whether the condition such as a software/hardware condition is satisfied; otherwise (i.e. when the tuple comprises no condition information), Step 938 is entered and the processing circuit 120 directly executes the command of the tuple.

In Step 934, the processing circuit 120 checks whether each condition (e.g. a software condition and a hardware condition) is satisfied in order to selectively execute the command according to the condition information. For example, the tuple comprises condition information indicating a software condition where the command of the tuple is executed and further comprises condition information indicating a hardware condition where the command of the tuple is executed, such as the "S.W. condition" and the "H.W. condition" shown in FIG. 4. In Step 936, when each of the software condition and the hardware condition is satisfied, Step 938 is entered and the processing circuit 120 executes the command of the tuple; otherwise (i.e. either the software condition or the hardware condition is not satisfied) the flowchart shown in FIG. 5 ends without performing further operations.

Those skilled in the art will readily observe that numerous modifications and alterations of the device and method may be made while retaining the teachings of the invention.

What is claimed is:

1. An embedded system with authentication, comprising:
   a system read only memory (ROM) arranged to store a boot code;
   a processing circuit arranged to process at least according to the boot code in order to perform operations of the embedded system; and
   an authentication circuit arranged to perform authentication on a command script in order to determine whether the command script is authenticated, and arranged to prevent the command script from being executed by the processing circuit when the authentication circuit determines that the command script is not authenticated, wherein the command script is received from outside a chip where the system ROM, the processing circuit and the authentication circuit are positioned;
   wherein the embedded system further comprises a serial port; and when determining that the command script is not authenticated, the authentication circuit triggers the embedded system to download a program code from a host outside the chip through the serial port, and the processing circuit performs authentication on the program code according to the boot code.

2. The embedded system of claim 1, wherein the command script is stored in a non-volatile (NV) memory for being accessed by the processing circuit.

3. The embedded system of claim 1, wherein the command script comprises at least one tuple; and when the authentication circuit determines that the command script is authenticated, the processing circuit parses the tuple in order to determine whether the tuple is valid.

4. The embedded system of claim 3, wherein when determining that the tuple is invalid, the processing circuit prevents the tuple from being executed and triggers the embedded system to download another program code from the host through the serial port, and the processing circuit performs authentication on the program code according to the boot code.

5. The embedded system of claim 3, wherein when determining that the tuple is valid, the processing circuit executes the tuple.

6. The embedded system of claim 5, wherein the tuple comprises a command code representing a command; and when the tuple further comprises condition information indicating at least one condition where the command of the tuple is executed, the processing circuit checks whether the condition is satisfied in order to selectively execute the command according to the condition information, otherwise, the processing circuit directly executes the command of the tuple.

7. The embedded system of claim 6, wherein the condition comprises a software condition and/or a hardware condition; and the tuple further comprises at least one command parameter for the command.

8. The embedded system of claim 5, wherein when the processing circuit executes the tuple unsuccessfully the processing circuit triggers a system hang to stop operations of the embedded system.

9. The embedded system of claim 5, wherein when the processing circuit executes the tuple successfully and the tuple leads to a jump operation, the processing circuit executes a program code as a result of the jump operation.

10. The embedded system of claim 5, wherein when the processing circuit executes the tuple successfully and the tuple does not lead to a jump operation and there is a next tuple within the command script, the processing circuit parses the next tuple in order to determine whether the next tuple is valid.

11. The embedded system of claim 5, wherein when the processing circuit executes the tuple successfully and the tuple does not lead to a jump operation and there is not a next tuple within the command script, the processing circuit triggers the embedded system to download another program code from the host through the serial port, and the processing circuit performs authentication on the program code according to the boot code.

12. An authentication method of an embedded system, comprising:
   providing a system read only memory (ROM), a processing circuit and an authentication circuit;
   utilizing the system ROM to store a boot code;
   utilizing the processing circuit to process at least according to the boot code in order to perform operations of the embedded system; and
   utilizing the authentication circuit to perform authentication on a command script in order to determine whether the command script is authenticated, and prevent the command script from being executed by the processing circuit when the authentication circuit determines that the command script is not authenticated, wherein the command script is received from outside a chip where the system ROM, the processing circuit and the authentication circuit are positioned;

wherein the embedded system further comprises a serial port; and the authentication method further comprises:
   when the authentication circuit determines that the command script is not authenticated, utilizing the authentication circuit to trigger the embedded system to download a program code from a host outside the chip through the serial port, and utilizing the processing circuit to perform authentication on the program code according to the boot code.

13. The authentication method of claim 12, wherein the command script is stored in a non-volatile (NV) memory for being accessed by the processing circuit.

14. The authentication method of claim 12, wherein the command script comprises at least one tuple; and the authentication method further comprises:
   when the authentication circuit determines that the command script is authenticated, utilizing the processing circuit to parse the tuple in order to determine whether the tuple is valid.

15. The authentication method of claim 14, wherein the authentication method further comprises:
   when the processing circuit determines that the tuple is invalid, utilizing the processing circuit to prevent the tuple from being executed and trigger the embedded system to download another program code from the host through the serial port, and utilizing the processing circuit to perform authentication on the program code according to the boot code.

16. The authentication method of claim 14, further comprising:
   when the processing circuit determines that the tuple is valid, utilizing the processing circuit to execute the tuple.

17. The authentication method of claim 16, wherein the tuple comprises a command code representing a command; and the authentication method further comprises:
   when the tuple further comprises condition information indicating at least one condition where the command of the tuple is executed, utilizing the processing circuit to check whether the condition is satisfied in order to selectively execute the command according to the condition information, otherwise, utilizing the processing circuit to directly execute the command of the tuple.

18. The authentication method of claim 17, wherein the condition comprises a software condition and/or a hardware condition; and the tuple further comprises at least one command parameter for the command.

19. The authentication method of claim 16, further comprising:
   when the processing circuit executes the tuple unsuccessfully, utilizing the processing circuit to trigger a system hang to stop operations of the embedded system.

20. The authentication method of claim 16, further comprising:
   when the processing circuit executes the tuple successfully and the tuple leads to a jump operation, utilizing the processing circuit to execute a program code as a result of the jump operation.

21. The authentication method of claim 16, further comprising:
   when the processing circuit executes the tuple successfully and the tuple does not lead to a jump operation and there is a next tuple within the command script, utilizing the processing circuit to parse the next tuple in order to determine whether the next tuple is valid.

22. The authentication method of claim 16, wherein the authentication method further comprises:
   when the processing circuit executes the tuple successfully and the tuple does not lead to a jump operation and there is not a next tuple within the command script, utilizing the processing circuit to trigger the embedded system to download another program code from the host through the serial port, and utilizing the processing circuit to perform authentication on the program code according to the boot code.

* * * * *